United States Patent
Hibino et al.

(10) Patent No.: US 11,326,230 B2
(45) Date of Patent: May 10, 2022

(54) HIGH TEMPERATURE COMPONENT AND METHOD FOR PRODUCING SAME

(71) Applicant: KAWASAKI JUKOGYO KABUSHIKI KAISHA, Kobe (JP)

(72) Inventors: Shinya Hibino, Kobe (JP); Kazushige Fujimitsu, Kakogawa (JP); Yoshimichi Nomura, Kobe (JP); Ryutaro Okada, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 138 days.

(21) Appl. No.: 16/616,285

(22) PCT Filed: May 11, 2018

(86) PCT No.: PCT/JP2018/018416
§ 371 (c)(1),
(2) Date: Nov. 22, 2019

(87) PCT Pub. No.: WO2018/216514
PCT Pub. Date: Nov. 29, 2018

(65) Prior Publication Data
US 2020/0087754 A1  Mar. 19, 2020

(30) Foreign Application Priority Data
May 22, 2017 (WO) ................ PCT/JP2017/019037

(51) Int. Cl.
| | | |
|---|---|---|
| *C22C 19/05* | (2006.01) | |
| *C22C 1/04* | (2006.01) | |
| *C22F 1/10* | (2006.01) | |
| *B22F 3/24* | (2006.01) | |
| *B22F 3/10* | (2006.01) | |
| *B22F 3/04* | (2006.01) | |
| *B22F 10/20* | (2021.01) | |
| *B22F 3/22* | (2006.01) | |

(52) U.S. Cl.
CPC .............. *C22C 19/056* (2013.01); *B22F 3/04* (2013.01); *B22F 3/1021* (2013.01); *B22F 3/225* (2013.01); *B22F 3/24* (2013.01); *B22F 10/20* (2021.01); *C22C 1/0433* (2013.01); *C22C 19/055* (2013.01); *C22F 1/10* (2013.01)

(58) Field of Classification Search
CPC ... C22C 19/055; C22C 19/056; C22C 1/0433; C22F 1/10; B22F 3/225; B22F 3/1021
See application file for complete search history.

(56) References Cited

U.S. PATENT DOCUMENTS

| | | | |
|---|---|---|---|
| 5,584,947 | A | 12/1996 | Raymond et al. |
| 5,725,692 | A * | 3/1998 | DeLuca ................ C22C 19/055 148/410 |
| 2006/0039817 | A1 | 2/2006 | Kelly |
| 2007/0227630 | A1 | 10/2007 | Augustins Lecallier et al. |
| 2010/0329883 | A1 | 12/2010 | Mourer et al. |
| 2012/0269646 | A1 | 10/2012 | Mitchell et al. |
| 2015/0322557 | A1 | 11/2015 | Etter et al. |
| 2017/0021424 | A1 | 1/2017 | Tsuno et al. |
| 2018/0100223 | A1 | 4/2018 | Kobayashi et al. |

FOREIGN PATENT DOCUMENTS

| | | |
|---|---|---|
| JP | H06-065601 A | 3/1994 |
| JP | 2007-051375 A | 3/2007 |
| JP | 2007-277721 A | 10/2007 |
| JP | 2011-012346 A | 1/2011 |
| JP | 2014-070230 A | 4/2014 |
| JP | 2015-227505 A | 12/2015 |
| JP | 2016-532777 A | 10/2016 |
| WO | 2012/047352 A2 | 4/2012 |
| WO | 2015/012888 A1 | 1/2015 |
| WO | 2016/013433 A1 | 1/2016 |
| WO | 2016/158705 A1 | 10/2016 |

OTHER PUBLICATIONS

Ian Dempster, Ronald Wallis, Heat Treatment Metallurgy of Nickel-Base Alloys, Heat Treating of Nonferrous Alloys, vol. 4E, ASM Handbook, Edited By George E. Totten, ASM International, 2016, p. 399-425, https://doi.org/10.31399/asm.hb.v04e.a0006261.*

* cited by examiner

*Primary Examiner* — Jessee R Roe
(74) *Attorney, Agent, or Firm* — Oliff PLC

(57) ABSTRACT

A method for producing a high temperature component includes a shaping step of shaping a powder compact of a desired high temperature component shape using a specific powder shaping method, from an alloy powder of γ' precipitation strengthening-type Ni-based alloy, and a crystal grain coarsening step of coarsening a crystal grain size of the powder compact by heat treatment, wherein the powder compact contains 0.002% or more and 0.07% or less of C, and 5.40% or more and 8.40% or less of Al+Ti by mass percentage.

8 Claims, 4 Drawing Sheets

[Fig. 1]
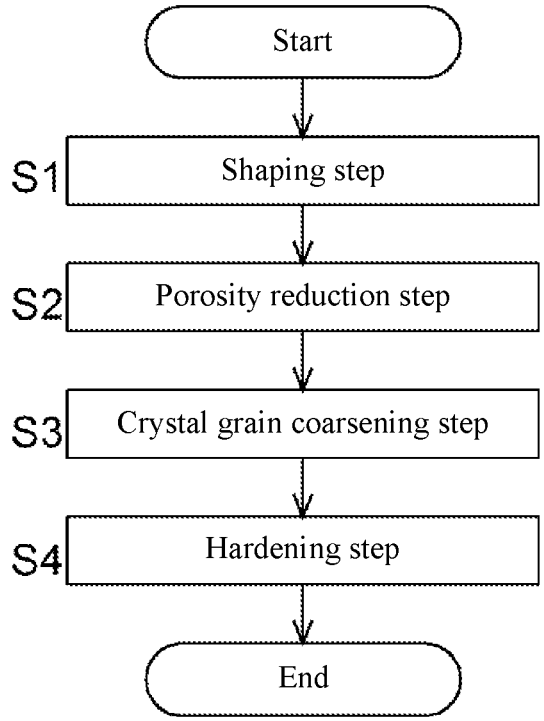
[Fig. 2]
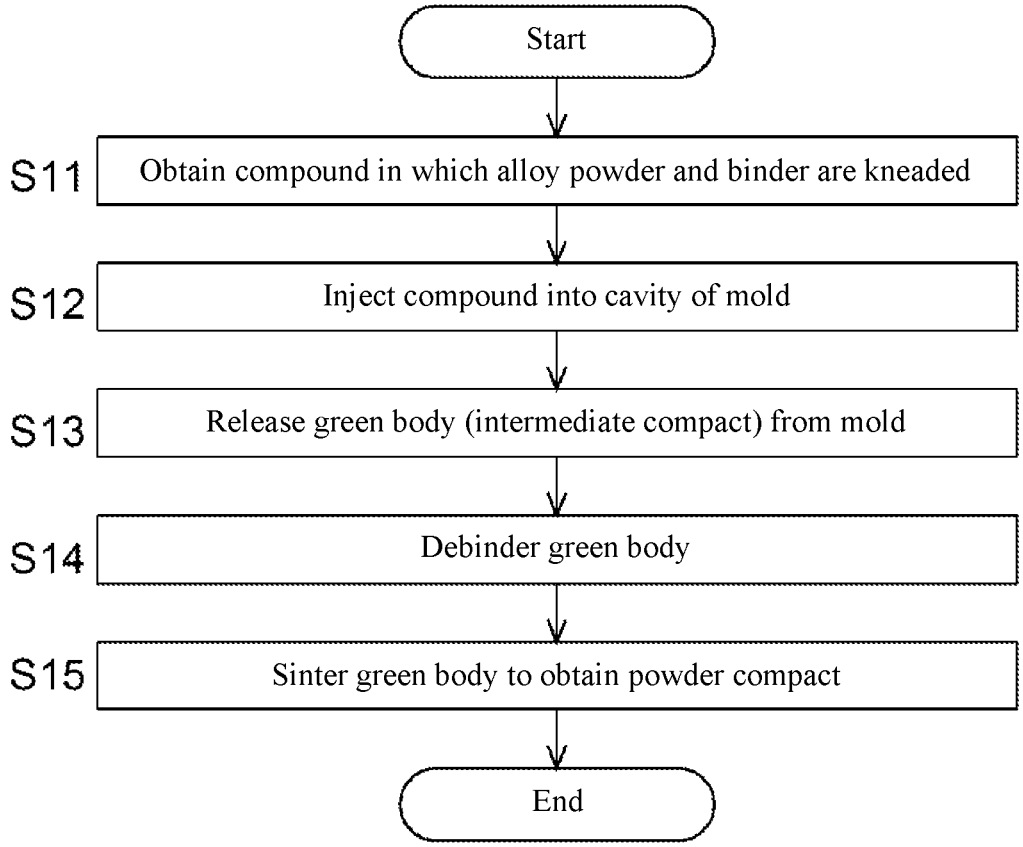

[Fig. 3]
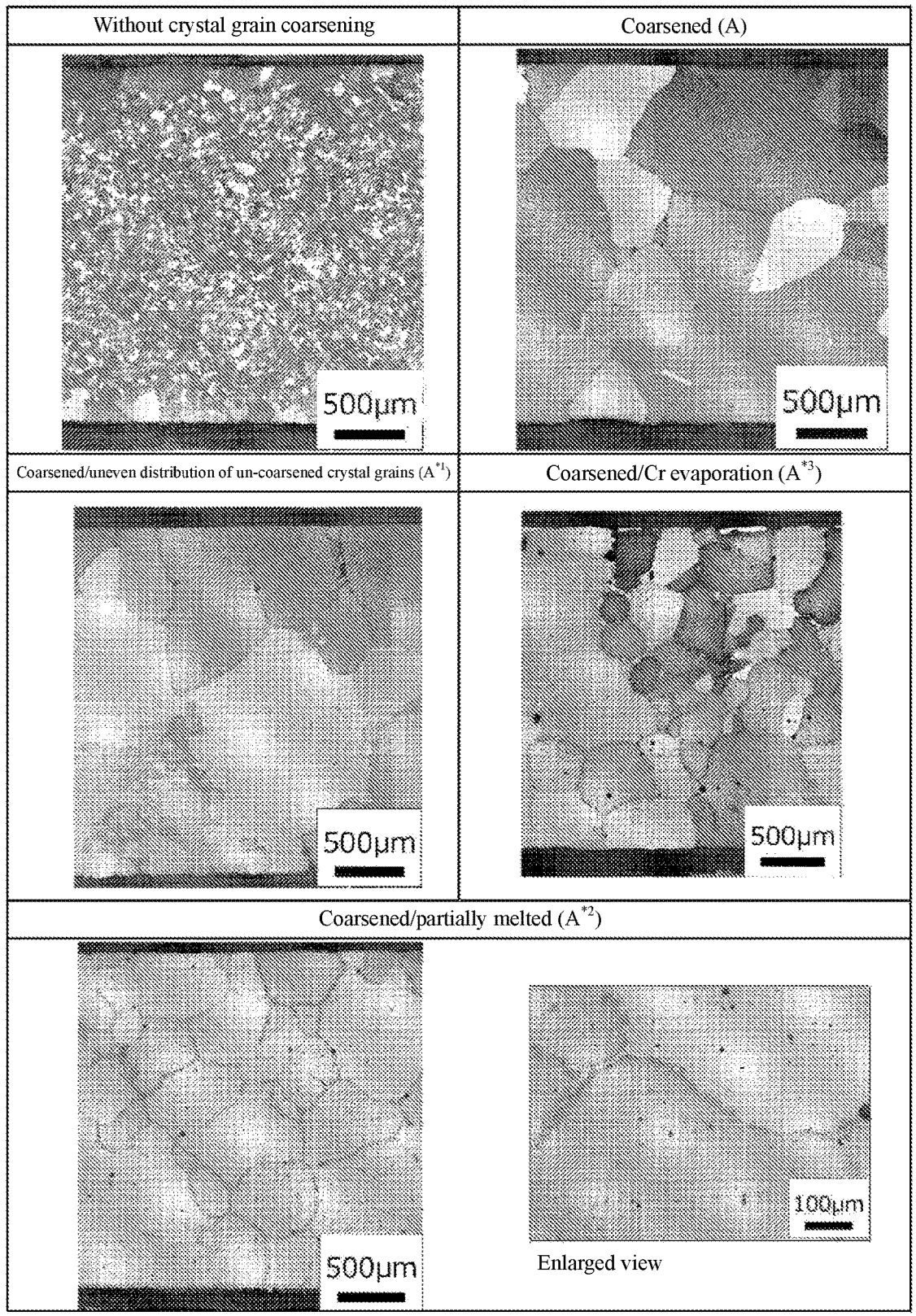

[Fig. 4]
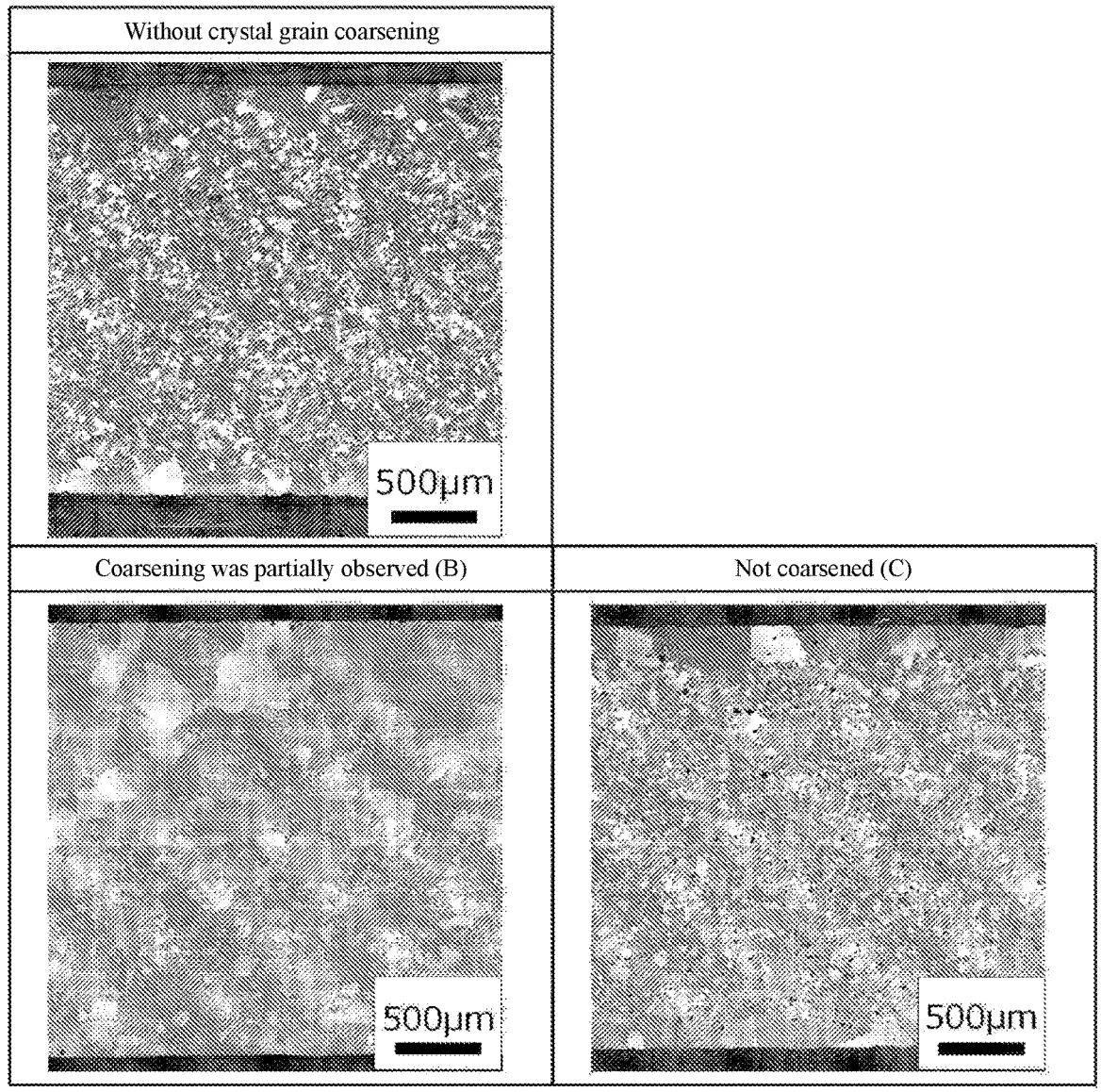

[Fig. 5]
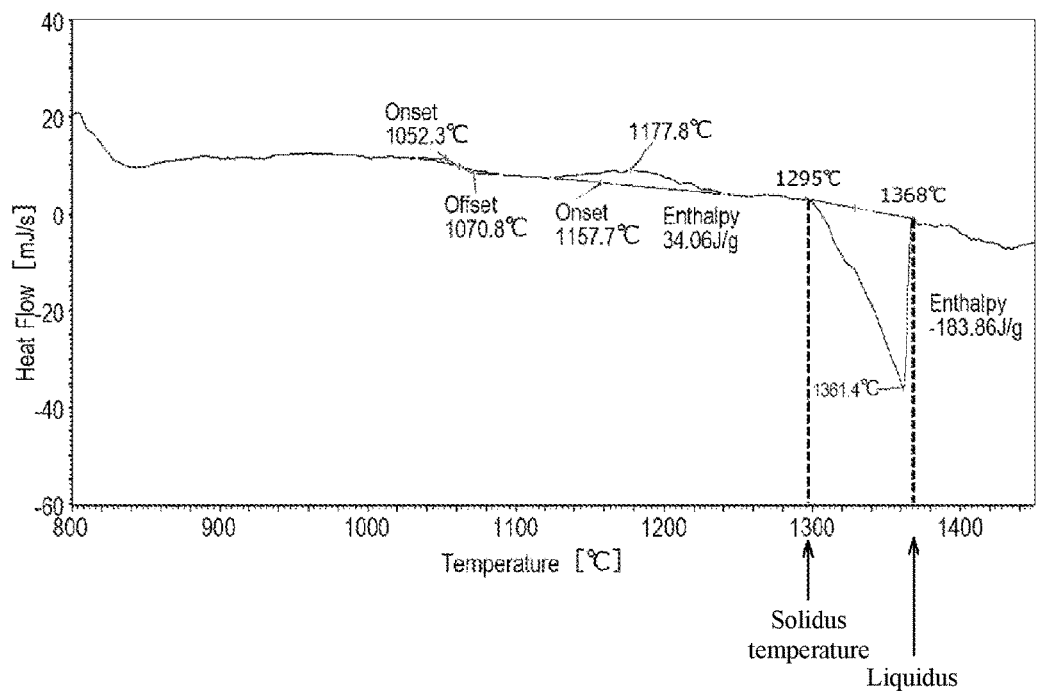
[Fig. 6]
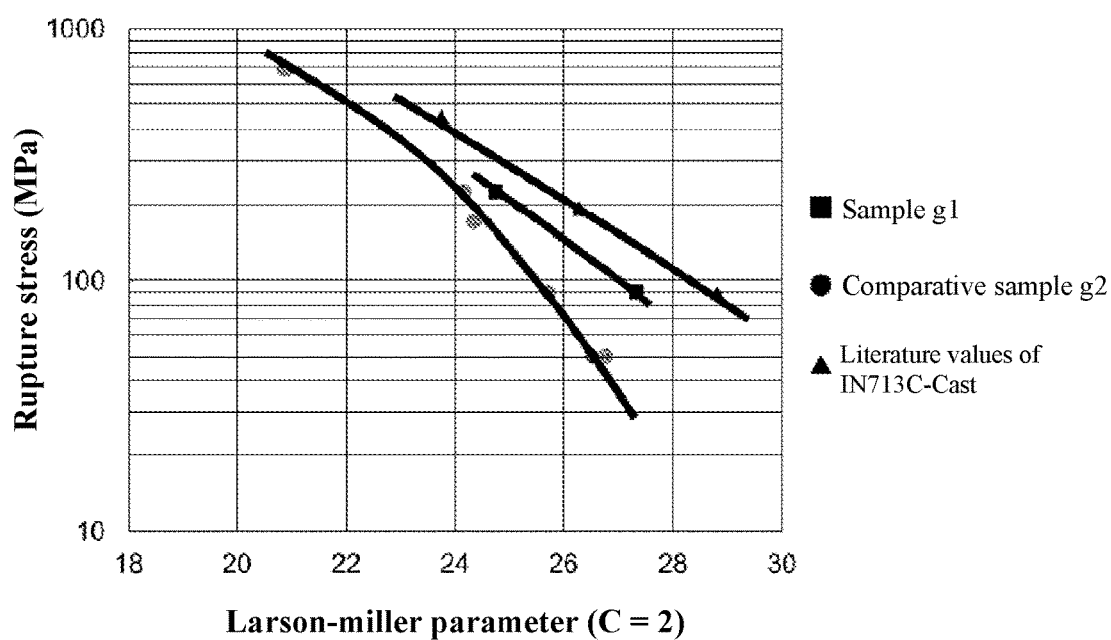

HIGH TEMPERATURE COMPONENT AND METHOD FOR PRODUCING SAME

TECHNICAL FIELD

The present invention relates to a high temperature component made of a γ' (gamma prime) precipitation strengthening-type Ni-based alloy and a method for producing the same.

BACKGROUND ART

Conventionally, for example, high temperature components such as a turbine component of a gas turbine engine are made of a superalloy material that exhibits predetermined mechanical properties in a high-temperature environment. As such a superalloy material, a γ' precipitation strengthening-type Ni-based alloy intended for finely precipitating an intermetallic compound called a γ' phase to improve high-temperature strength is known. The γ' precipitation strengthening-type Ni-based alloy contains, for example, at least one of Cr (chromium), W (tungsten), Mo (molybdenum), Re (rhenium) and Co (cobalt) as a main element that forms a solid solution with a parent phase (γ matrix phase) and strengthens the parent phase, and contains at least one of Al (aluminum), Ti (titanium), Ta (tantalum), Nb (niobium) and V (vanadium) as a main element forming a γ' phase (mainly, $Ni_3(Al,Ti)$) by combining with Ni (nickel). PTLs 1 and 2 disclose this kind of γ' precipitation strengthening-type nickel-based alloy and components made thereof.

The manufacturing process of a component made of a γ' precipitation strengthening-type nickel-based alloy described in PTL1 includes the steps of obtaining a billet in which alloy powder is consolidated by hot isostatic pressing (HIP) and/or extrusion consolidation, obtaining an intermediate product molded by net shape forging the billet at a temperature slightly lower than a γ' solvus temperature of the alloy (solid solution temperature of the γ' phase), and obtaining a product in which crystal grains are uniformly coarsened by performing a solution heat treatment (supersolvus heat treatment) at a temperature higher than the γ' solvus temperature of the alloy. In the solution heat treatment, a crystal grain structure of the intermediate product is recrystallized at a temperature higher than the γ' solvus temperature of the alloy and lower than an initial melting temperature, and a γ' precipitate is dissolved (solid solution) in the alloy, and then undergoes age hardening treatment for reprecipitation of the γ' phase inside the matrix or at the grain boundary.

The nickel-based alloy described in PTL2 is set to have a total content of Al, Ti, and Nb of 10.5% or more and 13% or less by atomic percent, in order to set a volume ratio of the γ' phase of 40 to 50%. A component made of this alloy is obtained by solidifying an alloy powder by hot isostatic pressing and/or drawing, molding it into a component by isothermal forging, subjecting the molded component to a recrystallization heat treatment, and cooling it. In the recrystallization heat treatment, a component having a coarse crystal grain microstructure exceeding 15 pin is obtained by treating at a temperature higher than the solvus temperature of the γ' phase of the alloy and lower than a melting start temperature of the alloy.

Incidentally, as one of the powder metallurgy methods, metal injection molding (hereinafter referred to as "MIM"), which is a combination of a resin molding technique and a powder metallurgy technique, is known. The MIM manufacturing process generally includes the steps of obtaining a compound by uniformly kneading metal powder and a binder (plastic+wax), obtaining an intermediate compact by injecting the compound into a mold and releasing it from the mold, removing (debindering) the binder from the intermediate compact with heating, a catalyst, a solvent, or the like, and sintering the debindered intermediate compact to obtain a compact (powder compact).

CITATION LIST

Patent Literature

PTL1: JP 2016-532777 A
PTL2: JP 2007-277721 A

SUMMARY OF INVENTION

Technical Problem

MIM can mold three-dimensional shapes with near net shape, and has excellent points that a material yield is high and material costs and post-processing costs can be reduced, production running time is relatively short and productivity is high, and the like. Therefore, when MIM is applied to a production method for a high temperature component, there are many advantages such as being capable of providing a high temperature component at low cost.

It has been confirmed that a high temperature component having predetermined high-temperature characteristics can be produced by MIM with compositions such as IN718 (IN: Inconel is a registered trademark, hereinafter the same), which is a γ" precipitation strengthening-type Ni-based alloy. However, it is known that high temperature components produced by MIM with γ' precipitation strengthening-type Ni-based alloys are inferior in high-temperature characteristics.

The inventors of the present application have adopted an alloy having a typical composition of IN713C (hereinafter referred to as "IN713C-MIM") as an example of a γ' precipitation strengthening-type Ni-based alloy that constitutes a high temperature component to be produced by MIM, and investigated high-temperature characteristics of IN713C-MIM. IN713C is one of γ' precipitation strengthening-type Ni-based alloys with excellent creep resistance.

According to previous research on IN713C-MIM, IN713C-MIM has low creep resistance as compared to components produced by casting, and has not reached the high-temperature characteristics that can be adopted as high temperature components such as turbine components.

The inventors of the present application consider that the high-temperature characteristics of IN713C-MIM do not improve due to the fine crystal grain structure depending on the particle diameter of the metal powder as the raw material, and it is effective to coarsen the crystal grains in order to improve the high-temperature characteristics. In general, it is known that creep resistance is improved by the coarsening of crystal grains in a Ni-based alloy having high temperature resistance, and in the γ' precipitation strengthening-type Ni-based alloy described in PTL1, high-temperature characteristics including creep resistance are improved by the coarsening of crystal grains.

However, when the inventors of the present application conducted a heat treatment (supersolvus heat treatment) of IN713C-MIM in accordance with the technique described in PTL1, coarsening of crystal grains to a degree sufficient to improve creep resistance was not confirmed between before and after the heat treatment.

Also, PTLs 1 and 2 disclose a powder forging method in which a sintered body of alloy powder is forged. As disclosed in PTLs 1 and 2, it is known that the crystal grains can be coarsened by recrystallization and grain growth by heat treatment after straining the components before heat treatment by isothermal forging or cold forging. This is because, when a free energy of a material is increased due to dislocation accumulated in the crystal grains due to the applied plastic strain, the recrystallized crystal grains generated using this free energy as a driving force become fine, and a grain boundary energy to be a driving force for grain growth is higher as the crystal grains are finer. However, both MIM and forging are material processing technologies, and forging a powder compact molded by MIM is not usually performed, and thus MIM and forging are incompatible.

The present invention has been made in view of the above circumstances, and an object of the present invention is to suggest a technique for coarsening crystal grains of a structure of a high temperature component, when producing, from a metal powder, the high temperature component made of a γ' precipitation strengthening-type Ni-based alloy, using a powder shaping method other than a method including plastic working such as powder forging.

Solution to Problem

A typical composition of IN713C contains 0.08 to 0.20% by mass of C (carbon), and a powder compact obtained by shaping alloy powder of this composition by MIM further increases the content of C. The inventors of the present application have presumed that carbides (metal carbides) present at grain boundaries of the powder compact hinders grain boundary migration and inhibits crystal grain growth, and have reached an idea that one of the factors that inhibit coarsening of the IN713C-MIM crystal grains is the carbon content of the powder compact of IN713C-MIM.

Thus, a method for producing a high temperature component according to one embodiment of the present invention includes:
  a shaping step of shaping a powder compact of a desired high temperature component shape using a specific powder shaping method, from an alloy powder of γ' precipitation strengthening-type Ni-based alloy; and
  a crystal grain coarsening step of coarsening a crystal grain size of the powder compact by heat treatment,
  in which the powder compact contains 0.002% or more and 0.07% or less of C, and 5.40% or more and 8.40% or less of Al+Ti by mass percentage.

It has been found that, according to the method for producing a high temperature component, the content of C that is present at the grain boundaries of the powder compact and generates carbides that inhibit crystal grain growth is limited to 0.002% by mass or more and 0.07% or less in the powder compact, whereby the crystal grain size of the high temperature component obtained has grown from the particle diameter of the alloy powder. A high temperature component having a crystal structure coarsened by such crystal grain growth is expected to have high creep resistance.

Then, according to the method for producing a high temperature component, it is possible to produce a high temperature component including a γ' precipitation strengthening-type Ni-based alloy containing 0.002% or more and 0.07% or less of C, and 5.40% or more and 8.40% or less of Al+Ti by mass percentage, in which the average size of crystal grains is 150 μm or more, and the structure of the crystal grains is equiaxed in all cross sections in three orthogonal directions and non-dendritic structure. In the present specification and claims, a metal structure in which the average of the dimensional ratios (aspect ratios) between the major axis and the minor axis of each crystal grain is less than 2 is defined as "equiaxed structure".

The high temperature component may have a content of C of greater than 0.03% and 0.07% or less by mass percentage.

In the high temperature component, the γ' precipitation strengthening-type Ni-based alloy may contain, in addition to C, Al, and Ti, 4.60% or less of Nb+Ta, 5.00% or more and 22.80% or less of Cr, 19.50% or less of Co, 1.80% or more and 13.75% or less of Mo+W, 0.10% or less of B, 1.0% or less of Zr, and 2.0% or less of Hf by mass percentage.

Further, in the high temperature component, the γ' precipitation strengthening-type Ni-based alloy may contain 0.03% or more and 0.07% or less of C, 6.00% or more and 7.50% or less of Al+Ti, 1.50% or more and 3.00% or less of Nb+Ta, 11.00% or more and 15.00% or less of Cr, 3.80% or more and 5.20% or less of Mo, 0.005% or more and 0.020% or less of B, and 0.05% or more and 0.20% or less of Zr by mass percentage, with the balance being made up of Ni and inevitable impurities.

The method for producing a high temperature component may further include a porosity reduction step of reducing a porosity by applying an isotropic pressure to the powder compact using a gas pressure, which is performed between the shaping step and the crystal grain coarsening step, or simultaneously with the crystal grain coarsening step.

Also, in the method for producing a high temperature component, it is preferred that the crystal grain coarsening step includes heating the powder compact at a predetermined coarsening temperature in a vacuum atmosphere or an inert gas atmosphere, and the coarsening temperature is a temperature in the range of a pinning effect disappearance temperature specific to the powder compact or higher and a solidus temperature of the powder compact or lower. However, the solidus temperature may be a value obtained by adding a predetermined α° C. to a solidus temperature obtained by experiment.

Moreover, in the method for producing a high temperature component, the content of C may be greater than 0.03% and 0.07% or less by mass percentage.

Further, in the method for producing a high temperature component, the powder compact may include, in addition to C, Al, and Ti, 4.60% or less of Nb+Ta, 5.00% or more and 22.80% or less of Cr, 19.50% or less of Co, 1.80% or more and 13.75% or less of Mo+W, 0.10% or less of B, 1.0% or less of Zr, and 2.0% or less of Hf by mass percentage.

Furthermore, in the method for producing a high temperature component, the powder compact may contain 0.03% or more and 0.07% or less of C, 6.00% or more and 7.50% or less of Al+Ti, 1.50% or more and 3.00% or less of Nb+Ta, 11.00% or more and 15.00% or less of Cr, 3.80% or more and 5.20% or less of Mo, 0.005% or more and 0.020% or less of B, and 0.05% or more and 0.20% or less of Zr by mass percentage, with the balance being made up of Ni and inevitable impurities.

Also, in the method for producing a high temperature component, the specific powder shaping method is other than a powder forging method, and the shaping step may include collecting the alloy powder into the high temperature component shape and sintering the collected alloy powder.

Moreover, in the method for producing a high temperature component, the shaping step may include injecting a compound obtained by kneading the alloy powder and a resin binder into a mold to shape an intermediate compact, debindering the intermediate compact, and sintering the debindered intermediate compact to obtain the powder compact.

Thus, a high temperature component with high shape accuracy can be obtained by using MIM to obtain a powder compact shaped into a shape of a high temperature component. Furthermore, by using MIM, the material yield is high, material costs and post-processing costs can be reduced, and production running time is relatively short, and thus an improvement in productivity can be expected.

In the method for producing a high temperature component, it is preferred that the average particle diameter of the alloy powder is 20 μm or more and 60 μm or less.

When the alloy powder has the above average particle diameter, properties for removing the resin binder from gaps between the powders when the intermediate compact is debindered are expected to be improved.

Further, in the method for producing a high temperature component, it is preferred that the alloy powder contains 0.002% or more and 0.02% or less of C by mass percentage.

Advantageous Effects of Invention

According to the present invention, when producing, from a metal powder, a high temperature component made of a γ' precipitation strengthening-type Ni-based alloy having excellent high-temperature characteristics using a shaping method other than forging such as MIM, crystal grains of a structure of the high temperature component can be coarsened.

BRIEF DESCRIPTION OF DRAWINGS

FIG. 1 is a flowchart of a method for producing a high temperature component.

FIG. 2 is a flowchart of treatment of a shaping step.

FIG. 3 is a table of structural photographs corresponding to criteria for evaluation of crystal grain coarsening.

FIG. 4 is a table of structural photographs corresponding to criteria for evaluation of crystal grain coarsening FIG. 5 is a diagram showing an example of a DSC thermogram of a powder compact.

FIG. 6 is a chart showing results of creep tests of high temperature components.

DESCRIPTION OF EMBODIMENTS

The method for producing a high temperature component according to the present invention is used, for example, as a method for producing a high temperature component suitable for use in a severe high-temperature environment, such as a turbine component of a gas turbine engine. This high temperature component is made of a γ' precipitation strengthening-type Ni-based alloy having a high-temperature strength (particularly, creep resistance) superior to that of stainless steel and heat-resistant steel.

Table 1 shows the ratio (mass percentage) of elements contained in the γ' precipitation strengthening-type Ni-based alloy (hereinafter simply referred to as "alloy") constituting the high temperature component. This alloy contains 0.002% or more and 0.07% or less (preferably 0.006% or more and 0.07% or less, and further preferably greater than 0.03% and 0.07% or less) of C (carbon) by mass percentage. Further, the sum (Al+Ti) of the Al (aluminum) content and the Ti (titanium) content of the alloy is 5.40% or more and 8.40% or less by mass percentage. The alloy may contain, in addition to the above C, Al and Ti, 5.00% or more and 22.80% or less of Cr (chromium), 19.50% or less (including 0%) of Co (cobalt), 1.80% or more and 13.75% or less of Mo (molybdenum)+W (tungsten), 4.60% or less (including 0%) of Nb (niobium)+Ta (tantalum), 0.10% or less (excluding 0%) of B (boron), 1.0% or less (excluding 0%) of Zr (zirconium), 2.0% or less (including 0%) of Hf by mass percentage, and Ni (nickel) and impurities as the balance.

TABLE 1

| C | Al + Ti | Cr | Co | Mo + W | Nb + Ta | B | Zr | Hf | Ni + impurities |
|---|---------|-----|------|---------|---------|------|------|------|-----------------|
| 0.002 ≤ 0.07 | 5.40 ≤ 8.40 | 5.00 ≤ 22.80 | ≤19.50 | 1.80 ≤ 13.75 | ≤4.60 | ≤0.10 | ≤1.0 | ≤2.0 | Bal. |

The content is expressed as mass percentage.

TABLE 2

| | IN713C AMS5391 | | IN713LC AMS5377 | | alloy α | | Mar-M246 + Hf | | Mar-M247 | | CM 247LC | B1900 AMS5405 | |
|---|---|---|---|---|---|---|---|---|---|---|---|---|---|
| | min | max | min | max | min | max | min | max | min | max | nor | min | max |
| Cr | 12.00 | 14.00 | 11.00 | 13.00 | 13.00 | 15.00 | 8.00 | 10.00 | 8.00 | 8.80 | 8.10 | 7.50 | 8.50 |
| Co | | 1.00 | | | | | 9.00 | 11.00 | 9.00 | 1.00 | 9.20 | 9.50 | 10.50 |
| Mo | 3.80 | 5.20 | 3.80 | 5.20 | 3.80 | 5.20 | 2.25 | 2.75 | 0.50 | 0.80 | 0.50 | 5.75 | 6.25 |
| W | | | | | | | 9.00 | 1.00 | 9.50 | 10.50 | 9.50 | | 0.10 |
| Nb | 1.80 | 2.80 | 1.50 | 2.50 | 1.80 | 3.00 | | | | | | | 0.10 |
| Ta | | 0.15 | | 0.15 | | | 1.25 | 1.75 | 2.80 | 3.80 | 3.20 | 4.00 | 4.50 |
| Al | 5.50 | 6.50 | 5.50 | 6.50 | 5.50 | 6.50 | 5.25 | 5.75 | 5.30 | 5.70 | 5.60 | 5.75 | 6.25 |
| Ti | 0.50 | 1.00 | 0.50 | 0.90 | 0.50 | 1.00 | 1.25 | 1.75 | 0.90 | 1.20 | 0.70 | 0.80 | 1.20 |
| C | 0.08 | 0.20 | 0.03 | 0.07 | 0.08 | 0.20 | 0.13 | 0.17 | 0.13 | 0.17 | 0.07 | 0.08 | 0.13 |

TABLE 2-continued

| | IN713C min | IN713C max | IN713LC min | IN713LC max | Mar-M246+Hf min | Mar-M246+Hf max | Mar-M247 min | Mar-M247 max | CM247LC min | CM247LC max | B1900 nor | alloy a min | alloy a max |
|---|---|---|---|---|---|---|---|---|---|---|---|---|---|
| B | 0.005 | 0.015 | 0.005 | 0.15 | 0.005 | 0.020 | 0.010 | 0.020 | 0.010 | 0.020 | 0.015 | 0.01 | 0.02 |
| Zr | 0.05 | 0.15 | 0.05 | 0.15 | 0.05 | 0.20 | 0.03 | 0.08 | 0.03 | 0.08 | 0.015 | 0.05 | 0.10 |
| Hf | | | | | | | 1.50 | 2.00 | 1.20 | 1.60 | 1.40 | | |
| Ni | Bal. | | Bal. | | Bal. | | Bal. | | Bal. | | Bal. | Bal. | |

| | B1900+Hf AMS5406 min | B1900+Hf AMS5406 max | Rene'80 min | Rene'80 max | IN738 min | IN738 max | IN738LC min | IN738LC max | IN792 nor | Rene'95 min | Rene'95 max | IN939 min | IN939 max |
|---|---|---|---|---|---|---|---|---|---|---|---|---|---|
| Cr | 7.50 | 8.50 | 13.70 | 14.30 | 15.70 | 16.30 | 15.70 | 16.30 | 12.40 | 12.00 | 14.00 | 22.00 | 22.80 |
| Co | 9.50 | 10.50 | 9.00 | 10.00 | 8.00 | 9.00 | 8.00 | 9.00 | 9.00 | 7.00 | 9.00 | 18.50 | 19.50 |
| Mo | 5.75 | 6.25 | 3.70 | 4.30 | 1.50 | 2.00 | 1.50 | 2.00 | 1.90 | 3.30 | 3.70 | | |
| W | | 0.10 | 3.70 | 4.30 | 2.40 | 2.80 | 2.40 | 2.80 | 3.80 | 3.30 | 3.70 | 1.80 | 2.20 |
| Nb | | 0.10 | | 0.10 | 0.60 | 1.10 | 0.60 | 1.10 | | 3.30 | 3.70 | 0.90 | 1.10 |
| Ta | 4.00 | 4.50 | | 0.10 | 1.50 | 2.00 | 1.50 | 2.00 | 3.90 | | 0.20 | 1.30 | 1.50 |
| Al | 5.75 | 6.25 | 2.80 | 3.20 | 3.20 | 3.70 | 3.20 | 3.70 | 3.10 | 3.30 | 3.70 | 1.80 | 2.00 |
| Ti | 0.80 | 1.20 | 4.80 | 5.20 | 3.20 | 3.70 | 3.20 | 3.70 | 4.50 | 2.30 | 2.70 | 3.60 | 3.80 |
| C | 0.08 | 0.13 | 0.15 | 0.19 | 0.15 | 0.20 | 0.09 | 0.13 | 0.12 | 0.04 | 0.09 | 0.13 | 0.17 |
| B | 0.01 | 0.02 | 0.01 | 0.02 | 0.005 | 0.015 | 0.007 | 0.012 | 0.020 | 0.006 | 0.015 | | |
| Zr | 0.05 | 0.10 | 0.02 | 0.10 | 0.05 | 0.15 | 0.03 | 0.08 | 0.10 | 0.03 | 0.07 | | |
| Hf | 1.05 | 1.25 | | 0.10 | | | | | | | | | |
| Ni | Bal. | | Bal. | | Bal. | | Bal. | | Bal. | Bal. | | Bal. | |

Examples of an alloy having a composition shown in Table 1 include those obtained by changing the ratio of C to 0.002% by mass or more and 0.07% by mass or less (preferably 0.006% by mass or more and 0.07% by mass or less, and further preferably greater than 0.03% by mass and 0.07% by mass or less), from typical compositions (or nominal compositions) of γ' precipitation strengthening-type Ni-based alloys shown in Table 2 (alloy trade names: IN713C, IN713LC, Mar-M246+Hf, Mar-M247, CM247LC, B1900, B1900+Hf, Rene'80, IN738, IN738LC, IN792, Rene'95, IN939, alloy a (original alloy)).

For example, the γ' precipitation strengthening-type Ni-based alloys based on the typical compositions of IN713C, IN713LC, and alloy a shown in Table 2 contain 0.002% or more and 0.07% or less (preferably 0.006% or more and 0.070% or less, and further preferably greater than 0.03% and 0.7% or less) of C, 6.00% or more and 7.50% or less of Al+Ti, 1.50% or more and 3.0% or less of Nb+Ta, 11.00% or more and 15.00% or less of Cr, 3.80% or more and 5.20% or less of Mo, 0.005% or more and 0.020% or less of B, and 0.05% or more and 0.20% or less of Zr by mass percentage, with the balance being Ni and inevitable impurities.

Further, for example, the γ' precipitation strengthening-type Ni-based alloy based on the typical composition of alloy a shown in Table 2 contains 0.002% or more and 0.07% or less (preferably 0.006% or more and 0.07% or less, and further preferably greater than 0.03% and 0.7% or less) of C, 6.00% or more and 7.50% or less of Al+Ti, 1.80% or more and 3.00% or less of Nb+Ta, 13.00% or more and 15.00% or less of Cr, 3.80% or more and 5.20% or less of Mo, 0.005% or more and 0.020% or less of B, 0.05% or more and 0.20% or less of Zr by mass percentage, with the balance being made up of Ni and inevitable impurities.

Here, a method for producing a high temperature component will be described with reference to FIG. 1. FIG. 1 is a flowchart showing a flow of producing a high temperature component.

As shown in FIG. 1, the production process of the high temperature component includes a shaping step (step S1) of shaping a powder compact of a desired high temperature component shape from an alloy powder, a porosity reduction step (step S2) of reducing a porosity by pressurizing the shaped powder compact, and a crystal grain coarsening step (step S3) of coarsening a crystal grain size of the powder compact with reduced porosity by heat treatment. The production process of the high temperature component may further include a hardening step (step S4) of hardening the powder compact with the coarsened grain size after the crystal grain coarsening step (step S3), depending on the type of alloy.

[Shaping Step]

In the shaping step (step S1), a powder compact is shaped from an alloy powder using a specific powder shaping method. The powder compact has a substantially desired high temperature component shape (net shape, near net shape) although some deformation in the porosity reduction step (step S2) and the heat treatment steps (step S3 and step S4) is taken into account, which will be described later.

Here, MIM is adopted as a powder shaping method. However, the shaping method of the powder compact is not limited to MIM, and a powder shaping method other than the powder forging method may be adopted. Such a powder shaping method involves collecting an alloy powder into a high temperature component shape and sintering it. As such a powder shaping method, any one of MIM, press compression shaping, hot isostatic pressing (HIP), cold isostatic pressing (CIP), and additive manufacturing (AM) may be adopted. In the press compression shaping, an intermediate product is formed by compression shaping an alloy powder in a mold having a desired high temperature component shape, and the intermediate product is sintered to obtain a powder compact. In the hot isostatic pressing, an alloy powder is filled into a high temperature component-shaped capsule, an intermediate product is formed by applying uniform high pressure and high temperature to the capsule, and the intermediate product is sintered to obtain a powder compact. In the cold isostatic pressing, an alloy powder is sealed in a high temperature component shape, a uniform liquid pressure is applied thereto to form an intermediate product, and the intermediate product is sintered to obtain a powder compact. In the additive manufacturing, an alloy powder is melted and solidified by layer with a laser or an electron beam to form a powder compact having a desired shape. A method including plastic working such as forging, extrusion, rolling and drawing is not used as the shaping method of the powder compact. In particular, cold plastic working and isothermal plastic working below the recrystallization temperature of the material such that dislocations due to plastic strain applied to the material remain are not used for shaping a powder compact.

FIG. 2 is a flowchart of treatment of the shaping step. As shown in FIG. 2, in the shaping step (step S1), first, an alloy powder and a binder are uniformly kneaded to obtain a compound thereof (step S11). The compound is shaped into pellets with good moldability using a pelletizer. The binder may be those conventionally commonly used in MIM, and examples thereof include at least one of polypropylene (PP), polyethylene (PE), polyacetal (POM), polymethyl methacrylate (PMMA), carnauba wax (CW), paraffin wax (PW), stearic acid (St), and the like.

Table 3 shows the ratio (mass percentage) of elements contained in the alloy powder. This alloy powder is a Ni-based alloy powder containing 0.002% or more and 0.02% or less of C and 5.40% or more and 8.40% or less of Al+Ti by mass percentage. This alloy powder may contain, in addition to the above C, Al and Ti, 4.60% or less (including 0%) of Nb+Ta, 5.00% or more and 22.80% or less of Cr, 19.50% or less (including 0%) of Co, 1.80% or more and 13.75% or less of Mo+W, 0.10% or less (excluding 0%) of B, 1.0% or less (excluding 0%) of Zr, 2.0% or less (including 0%) of Hf by mass percentage, and Ni and impurities as the balance.

TABLE 3

| C | Al + Ti | Cr | Co | Mo + W | Nb + Ta | B | Zr | Hf | Ni + impurities |
|---|---|---|---|---|---|---|---|---|---|
| 0.002 ≤ 0.02 | 5.40 ≤ 8.40 | 5.00 ≤ 22.80 | ≤19.50 | 1.80 ≤ 13.75 | ≤4.60 | ≤0.10 | ≤1.0 | ≤2.0 | Bal. |

The content is expressed as mass percentage.

The alloy powder has an average particle diameter of 20 μm or more and 60 μm or less, and desirably 30 μm or more and 50 μm or less. Here, the average particle diameter is represented by a volume-based median diameter (d50). The volume-based median diameter is defined as a particle diameter at a volume-based relative particle amount of 50% based on particle size distribution (cumulative distribution) obtained by measuring a sample using a particle size distribution measuring device with a laser diffraction/scattering method as a measurement principle. This average particle diameter is larger than the average particle diameter (about 10 μm) of metal powders used in conventional general MIM.

The compound obtained as described above is injected into a cavity of a desired high temperature component shape of a mold using an injection molding machine (step S12). Then, the mold is opened, and a green body (intermediate compact) is released from the mold (step S13). The green body is obtained by injection molding a compound that is a kneaded product of an alloy powder and a binder.

Next, the binder is removed from the green body, that is, the intermediate compact is debindered (step S14). Debindering methods include a debindering method by immersing the green body in an organic solvent or water, and a debindering method by heating the green body in a debindering furnace at 100 to 600° C.

Subsequently, the debindered green body is sintered to obtain a powder compact (step S15). In this step, the debindered green body is generally heated at 1200 to 1300° C. for 0.5 to 3 hours. The sintering conditions used are determined also in consideration of economics so that temperature and time are combined to sufficiently densify the powder compact (for example, a specific density of 95% or more). This sintering step may be performed continuously with the above-described debindering step.

The inventors of the present application consider that one of the factors that inhibit crystal grain growth of the powder compact is a carbide present at crystal grain boundaries. Therefore, the process of the shaping step of the powder compact is controlled such that the carbon content of the powder compact is 0.002% or more and 0.07% or less (desirably 0.006% or more and 0.07% or less, and further preferably greater than 0.03% and 0.07% or less) by mass percentage. Specifically, the carbon content of the alloy powder is limited to 0.002% or more and 0.02% or less. In addition, since carbon contamination due to binder remaining on the powder surface is also considered in MIM, an alloy powder with a larger particle diameter as compared to the conventional one is adopted so that the binder is easily removed from the gap between the powders of the powder compact in the debindering treatment

[Porosity Reduction Step]

In the porosity reduction step (step S2), a gas pressure is applied to the powder compact so as to reduce the porosity of the powder compact obtained in the shaping step (step S1). Since pores in the powder compact can also be a pinning factor that inhibits the growth of crystal grains, the smaller the porosity of the powder compact after the porosity reduction step (step S2), the better.

In the porosity reduction step (step S2), for example, HIP (hot isostatic pressing) is used. Specifically, using a gas pressure, a high temperature of 900 to 1300° C. and an isotropic pressure of several tens to 200 MPa are simultaneously applied to a powder compact that is an object to be treated. The type of gas to be used in HIP is an inert gas (for example, Ar). While HIP parameters can be changed according to alloy composition and target cycle time of the treatment, it is preferable to set the temperature, pressure and time to a degree sufficient to substantially eliminate the porosity of the powder compact.

[Crystal Grain Coarsening Step]

In the crystal grain coarsening step (step S3), a coarsening heat treatment for coarsening the crystal grains of the powder compact is performed. In the coarsening heat treatment, the powder compact is heated at a predetermined coarsening temperature for a predetermined coarsening time in a vacuum or an inert gas atmosphere. In this heat treatment, since the powder compact does not have sufficient free energy for recrystallization, it is considered that recrystallization hardly occurs. In the above, the "vacuum atmosphere" refers to a space state where the pressure is less than 1000 Pa. Also, in the above, the "inert gas atmosphere" refers to a space state replaced with an inert gas such as Ar of 1000 Pa or more.

At the crystal grain boundaries of the powder compact, chemical compounds (hereinafter referred to as "carbides") composed of metal atoms such as Ti, Nb, Ta, Hf, Mo, Cr and Ni and carbon atoms contained in the alloy are present. MC carbide in which Ti, Nb, Ta and Hf are bonded with C in a ratio of about 1:1, $M_6C$ carbide in which Mo, Ni, Cr and the like are bonded with C in a ratio of about 6:1, $M_{23}C_6$ carbide in which Cr, Mo and the like are bonded with C in a ratio of about 23:6 and the like are known ("M" represents a metal element). Among them, the MC carbide is the most stable at high temperature, and the inventors of the present application consider that carbides present at the crystal grain boundaries of the powder compact, mainly MC carbides, exhibit a pinning force to hinder grain boundary migration. Moreover, it has been found from experiments that this pinning effect sharply drops at a certain temperature. Hereinafter, a temperature at which the pinning effect sharply drops is referred to as "pinning effect disappearance temperature". It is considered that, at the pinning effect disappearance temperature, a carbide that is present at the grain boundary and exhibits the pinning effect is decomposed, or the energy of grain boundary migration exceeds the pinning force and the carbide is swallowed by the migrating grain boundary, whereby the pinning effect sharply drops. According to this idea, by performing heat treatment at a coarsening temperature equal to or higher than the pinning effect disappearance temperature, factors that prevent the crystal growth of the powder compact disappear from the grain boundary, and it is expected to promote the coarsening of the crystal grains.

The pinning effect disappearance temperature varies depending on the composition of the alloy, and even alloys of similar compositions are considered to have different pinning effect disappearance temperatures depending on the carbon content. Therefore, the pinning effect disappearance temperature is experimentally obtained in advance, and the coarsening temperature is set to a temperature equal to or higher than the pinning effect disappearance temperature and equal to or lower than the solidus temperature of the powder compact. The solidus temperature of the powder compact is a temperature at which a liquid phase is first generated from the powder compact, and depends on the composition of the powder compact and its carbon content. When the coarsening temperature exceeds the solidus temperature, a liquid phase having a low melting point of some of the elements constituting the powder compact occurs and a partially molten layer is generated at the grain boundary, and thus a theoretical coarsening temperature is equal to or lower than the solidus temperature. However, in practice, a value obtained by adding $\alpha°$ C. to the solidus temperature may be used as the upper limit value of the coarsening temperature. $\alpha$ is defined as 20% of the difference between the liquidus temperature and the solidus temperature ($\alpha$= (liquidus temperature−solidus temperature)/5).

FIG. 5 shows an example of a DSC thermogram obtained by measuring the powder compact with a differential scanning calorimeter (DSC). The differential scanning calorimeter is a device which measures the temperature of a reference substance and a sample while applying a certain amount of heat to the sample, captures thermal properties of the sample as a temperature difference, and measures endothermic and exothermic reactions due to a state change of the sample. In the DSC thermogram shown in FIG. 5, the vertical axis represents heat flow [mJ/s], and the horizontal axis represents temperature [° C.].

In the DSC thermogram of FIG. 5, an exothermic peak is observed at the solvus temperature, and an endothermic peak is observed between the solidus temperature and the liquidus temperature. The temperature at which the endothermic peak begins to fall is defined as the solidus temperature, and the temperature at which the endothermic peak is fully increased is defined as the liquidus temperature.

The coarsening time is influenced by the coarsening temperature, in addition to the shape of the powder compact and the carbon content. The longer the coarsening time, the greater the degree of coarsening of the crystal grains, but it is uneconomical when the coarsening time is long. Therefore, the coarsening time may be determined from a balance between the size of crystal grains for high temperature components to have desired creep resistance and economical efficiency, based on the results obtained through experiments.

In addition, it is known that when the coarsening heat treatment is performed in a vacuum atmosphere, Cr contained in the alloy evaporates or Cr diffuses at the grain boundary during the evaporation process, whereby Cr is concentrated at the grain boundary. Therefore, when the evaporation of Cr in the alloy should be avoided, the coarsening heat treatment is performed in an inert gas atmosphere.

In the above, the porosity reduction step (step S2) is performed between the shaping step (step S1) and the crystal grain coarsening step (step S3), but the porosity reduction step (step S2) may be performed simultaneously with the crystal grain coarsening step (step S3). Further, as will be described later, when omitting the porosity reduction step (step S2), the crystal grain coarsening step (step S3) may be performed continuously with the sintering treatment in the shaping step (step S1).

[Hardening Step]

In the hardening step (step S4), predetermined solution treatment and aging treatment are performed for each alloy, and an appropriate γ' phase is dispersed and precipitated in a parent phase. These conditions are determined in consideration of the required mechanical characteristics. Some alloys exhibit strength without being subjected to hardening treatment (step S4), by slow cooling after the crystal grain coarsening step (step S3). Further, the solution treatment can be omitted by rapid cooling after the crystal grain coarsening step (step S3). High temperature components can be produced by the above steps (S1 to S4 or S1 to S3).

The method for producing a high temperature component described above includes a shaping step (step S1) of shaping a powder compact of a desired high temperature component shape, using a specific powder shaping method (other than a powder forging method) from an alloy powder of γ' precipitation strengthening-type Ni-based alloy, a porosity reduction step (step S2) of reducing a porosity by applying an isotropic pressure to the shaped powder compact using a gas pressure, and a crystal grain coarsening step (step S3) of coarsening crystals of the powder compact by heat treatment. The porosity reduction step (step S2) and the crystal grain coarsening step (step S3) may proceed simultaneously. Further, after the crystal grain coarsening step (step S3), a heat treatment for precipitating the γ' phase from the powder compact with the coarsened crystal grain size may be performed.

In the above, the shaping step involves collecting the alloy powder into a high temperature component shape and sintering it. As such a powder shaping method, any one of metal powder injection shaping, press compression shaping, hot isostatic pressing, cold isostatic pressing, and additive manufacturing may be adopted.

In the above, the powder compact contains 0.002% or more and 0.07% or less of C and 5.40% or more and 8.40% or less of Al+Ti by mass percentage. This powder compact may contain, in addition to the above C, Al and Ti, 4.60% or less (including 0%) of Nb+Ta, 5.00% or more and 22.80% or less of Cr, 19.50% or less (including 0%) of Co, 1.80% or more and 13.75% or less of Mo+W, 0.10% or less (excluding 0%) of B, 1.0% or less (excluding 0%) of Zr, and 2.0% or less (including 0%) of Hf by mass percentage.

Alternatively, the powder compact may contain greater than 0.03% and 0.07% or less of C, 6.00% or more and 7.50% or less of Al+li, 1.50% or more and 3.00% or less of Nb+Ta, 11.00% or more and 15.00% or less of Cr, 3.80% or more and 5.20% or less of Mo, 0.005% or more and 0.020% or less of B, and 0.05% or more and 0.20% or less of Zr by mass percentage, with the balance being made up of Ni and inevitable impurities, which corresponds to IN713LC and alloy a in Table 2. A high temperature component having such a composition becomes a γ' precipitation strengthening-type Ni-based alloy having excellent creep resistance.

It is known that, in high temperature components obtained by the above production method, the content of C that is present at the crystal grain boundaries of the powder compact and generates carbides that are thought to inhibit crystal growth is limited, and the crystal grain size grows from the grain size of the alloy powder by undergoing the crystal grain coarsening step. The growth of the crystal grain size is expected to improve the creep resistance of high temperature components. That is, according to the method for producing a high temperature component, it is possible to produce, from a metal powder, a high temperature component made of a γ' precipitation strengthening-type Ni-based alloy having excellent high-temperature characteristics using a shaping method other than forging such as MIM.

Then, according to the method for producing a high temperature component, it is possible to obtain a high temperature component made of a γ' precipitation strengthening-type Ni-based alloy containing 0.002% or more and 0.07% or less of C, and 5.40% or more and 8.40% or less of Al+Ti by mass percentage, in which the average size of crystal grains is 150 μm or more, and the structure of the crystal grains is equiaxed in all cross sections in three orthogonal directions and non-dendritic structure.

Moreover, in the method for producing a high temperature component, in the crystal grain coarsening step, the powder compact is heated at a predetermined coarsening temperature in a vacuum atmosphere or an inert gas atmosphere. Here, the "coarsening temperature" is a temperature in the range of equal to or higher than the pinning effect disappearance temperature inherent to the powder compact and equal to or lower than the solidus temperature of the powder compact.

In this way, the heat treatment for crystal grain coarsening is performed at the temperature in the range of equal to or higher than the pinning effect disappearance temperature at which the pinning effect of the carbides present at the grain boundaries of the powder compact sharply drops and equal to or lower than the solidus temperature of the powder compact, whereby there is no obstacle to the grain boundary migration of the powder compact, so that growth of crystal grains is expected to be promoted.

Moreover, in the method for producing a high temperature component, the shaping step includes injecting a compound obtained by kneading the alloy powder and the resin binder into a mold to shape an intermediate compact (green body), debindering the intermediate compact, and sintering the debindered intermediate compact to obtain the powder compact.

Thus, a high temperature component with high shape accuracy can be obtained by using MIM to obtain a powder compact shaped into a shape of a high temperature component. Furthermore, by using MIM, the material yield is high, material costs and post-processing costs can be reduced, and production running time is relatively short, and thus an improvement in productivity can be expected.

Then, when obtaining a powder compact shaped into the shape of a high temperature component using MIM, the volume-based average particle diameter (d50) of the alloy powder is set to 20 μm or more and 60 μm or less. Thus, when the alloy powder has the above average particle diameter, properties for removing the resin binder from gaps between the powders when the intermediate compact is debindered are expected to be improved.

Also, the alloy powder used in MIM contains 0.002% or more and 0.02% or less of C by mass percentage. Thus, by suppressing the content of C in the alloy powder to 0.002% or more and 0.02% or less, the content of C in the powder compact can be suppressed to 0.07% or less.

EXAMPLES

Next, an example of a method for producing a high temperature component according to the present invention will be described.

[Sample Preparation Procedure]

A sample preparation procedure common to each sample described below is as follows.

(Step S1)

A compound obtained by uniformly kneading an alloy powder and a binder was injected into a mold to obtain a plate-like green body with a thickness of about 1 to 3 mm. The binder used was a mixture of PP, POM and PW, or a mixture of PP, PMMA and PW, depending on the sample. Table 4 shows the ratio (mass percentage) of elements contained in the alloy powder of each sample. The alloy powders of Samples a1 to a6, b1 to b7, c1 to c5, d1 to d12, e1 to e6, f1, g1, and h1 were obtained by changing in the ratio of C from the composition of "alloy a" in Table 2.

Further, the average particle diameter (d50) of the alloy powders is 48.0 μm in all cases except for Samples a1 to a4, f2, and g2 described later.

The obtained green body was heated and debindered while gradually raising the temperature from room temperature to 500° C., and further continuously heated under appropriate sintering conditions (furnace temperature and time) so that sufficient densification proceeded to obtain a powder compact.

(Step S2)

The powder compacts obtained in the step S1 were subjected to HIP under conditions of 1204° C., 4 hours, and 102 to 104 MPa Ar atmosphere. In some samples, this HIP was intentionally omitted.

(Step S3)

The powder compacts whose pores were reduced by the step S2 were heated at a coarsening temperature in a vacuum or an Ar atmosphere for a coarsening time. The coarsening temperature and the coarsening time were different for each sample.

(Step S4)

The powder compacts that had undergone the coarsening heat treatment in the step S3 were subjected to solution treatment at 1204° C. for 2 hours, and then two-stage aging treatment was performed at 840° C. for 4 hours and 760° C. for 12 hours to obtain samples. In any treatment, gas fan cooling was performed for cooling. The step S4 was performed only for the sample for which a strength test would be performed, and was omitted for the sample for which structure observation would be performed.

TABLE 4

| Sample No. | C | Al | Ti | Cr | Co | Mo | W | Nb | Ta | B | Zr | Hf | Ni + impurities |
|---|---|---|---|---|---|---|---|---|---|---|---|---|---|
| a1-2 | 0.006 | 5.74 | 0.70 | 13.5 | — | 4.18 | — | 2.01 | — | 0.007 | 0.11 | — | Bal. |
| a5-6 | | | | | | | | | | | | | |
| b1-7 | | | | | | | | | | | | | |
| c1-5 | | | | | | | | | | | | | |
| d1-12 | | | | | | | | | | | | | |
| e1-6 | | | | | | | | | | | | | |
| f1 | | | | | | | | | | | | | |
| g1 | | | | | | | | | | | | | |
| h1 | | | | | | | | | | | | | |
| a3-4 | 0.01 | 5.60 | 0.69 | 13.0 | — | 4.20 | — | 2.01 | — | 0.010 | 0.12 | — | Bal. |
| f2 | 0.10 | 5.77 | 0.79 | 12.8 | — | 4.19 | — | 2.09 | — | 0.012 | 0.06 | — | Bal. |
| g2 | | | | | | | | | | | | | |
| h2 | 0.006 | 5.71 | 0.69 | 13.4 | — | 4.15 | — | 1.99 | 1.65 | 0.007 | 0.11 | — | Bal. |
| h3 | 0.006 | 5.65 | 0.69 | 13.3 | — | 4.12 | — | 1.98 | — | 0.007 | 0.11 | 1.50 | Bal. |

The content is expressed as mass percentage.

[Sample Observation and Evaluation Procedures]

The plate-like sample was cut so that the thickness direction was included in the visual field and then embedded in a resin, the cut surface was polished, etched with a marble liquid, and the cut surface was imaged with an optical microscope. Then, using a structural photograph (image) obtained by imaging, the average grain size of crystals was determined by the following procedures (1) to (3). In addition, when sharpness of the image was insufficient for evaluation of the crystal grain size in the entire thickness direction in one structural photograph, a combined photograph of a plurality of structural photographs was used as the structural photograph. In addition, the imaging range of structural photographs was set so that the aspect ratio of the thickness direction and the orthogonal direction thereto was about 1:1.

(1) Draw 20 lines at equal intervals in the vertical and horizontal directions for the entire imaging range of the structural photograph, and count the number of intersections with the grain boundaries for each line.

(2) Divide the value obtained by converting the length of each line drawn on the metal structure (i.e., not on the resin) in the structural photograph into the actual dimension based on a scale bar in the photograph by the number obtained in (1), and define the obtained value as a grain size in each line.

(3) Define the average value of the grain sizes obtained for each line excluding a line passing through a resin part as an average crystal grain size.

When the average grain size was 150 μm or more, it was evaluated that the crystal grain size was coarsened, and when the average grain size was less than 150 μm, it was evaluated that coarsening of the crystal grain size was insufficient. In addition, based on the structural photographs, the presence or absence of uneven distribution of un-coarsened crystal grains, the presence or absence of partial melting of grain boundaries, and the presence or absence of evaporation of Cr were also evaluated. Table 5 below shows criteria for evaluation of crystal grain coarsening, and FIGS. 3 and 4 show structural photographs corresponding to the criteria for evaluation of crystal grain coarsening.

TABLE 5

| Evaluation | | Criteria |
|---|---|---|
| A | Coarsened | The average crystal grain size is 150 μm or more |
| A$^{*1}$ | Coarsened/Uneven distribution of uncoarsened crystal grains | While the average crystal grain size is 150 μm or more, 10 or more crystal grains with a crystal grain size of 100 μm or less crowd |
| A$^{*2}$ | Coarsened/Partially melted | While the average crystal grain size is 150 μm or more, partial melting is observed at the grain boundaries |
| A$^{*3}$ | Coarsened/Cr evaporation | While the average crystal grain size is 150 μm or more, Cr evaporation is observed |
| B | Coarsening was partially observed | While the average crystal grain size is less than 150 μm, coarsened crystal grains are observed even inside the cross section of the sample |
| C | Not coarsened | There is no change in the average crystal grain size between before and after the coarsening heat treatment, except the outermost surface of the sample |

As shown in Table 5 and FIG. 3, one evaluated as "coarsened (A)" has an average crystal grain size of 150 μm or more, and a crystal grain structure thereof is an equiaxed in all cross sections in three orthogonal directions and non-dendritic structure. In addition, while one evaluated as "coarsened/uneven distribution of un-coarsened crystal grains (A$^{*1}$)" can satisfy the evaluation criteria of (A) above, 10 or more crowds of crystal grains with an average crystal grain size of 100 μm or less are confirmed in the structural photograph. Also, while one evaluated as "coarsened/partially melted (A$^{*2}$)" can satisfy the evaluation criteria of (A) above, partial melting is observed at the grain boundaries in the structural photograph. Moreover, while one evaluated as "coarsened/Cr evaporation (A$^{*3}$)" can satisfy the evaluation criteria of (A) above, Cr evaporation is observed at the grain boundaries in the structural photograph. As shown in Table 5 and FIG. 4, while one evaluated as "coarsening was partially observed (B)" has an average crystal grain size of less than 150 μm, coarsened crystal grains are observed even inside the cross section of the sample. Moreover, one evaluated as "not coarsened (C)" does not satisfy the evaluation criteria (A) and (B) above.

[Procedure for Measuring Carbon Content of Powder Compact]

A plate-like sample was cut into a faceted shape with a drill or the like, and the carbon content of the powder compact was measured using a non-dispersive infrared absorption method. However, in the powder compact prepared by MIM, since the carbon content on the outermost surface of the sample may be measured low due to the difference in properties for removing binder, it was noted that facets were collected from within the sample.

[Verification of Carbon Content Reduction Effect Depending on Alloy Powder Size]

In the shaping step (step S1), an experiment was conducted to verify that the carbon content of the powder compact can be reduced depending on the alloy powder size.

Sample a1 was obtained by the above-described sample preparation procedure, using an alloy powder with an average particle diameter (d50) of 10.9 μm, at a coarsening temperature of 1280° C., for a coarsening time of 12 hours, in a coarsening atmosphere of 10 kPa Ar atmosphere. The carbon content of the powder compact of Sample a1 was 0.074% by mass.

Sample a2 was obtained by the above-described sample preparation procedure, using an alloy powder with an average particle diameter (d50) of 23.6 μm, at a coarsening temperature of 1280° C., for a coarsening time of 12 hours, in a coarsening atmosphere of 10 kPa Ar atmosphere. The carbon content of the powder compact of Sample a2 was 0.050% by mass.

Samples a3 to a4 were obtained by the above-described sample preparation procedure, using an alloy powder with an average particle diameter (d50) of 30.7 μm, at a coarsening temperature of 1280° C., for a coarsening time of 12 hours, in a coarsening atmosphere of 10 kPa Ar atmosphere. The carbon content of the powder compact of Sample a3 was 0.061% by mass, and the carbon content of the powder compact of Sample a4 was 0.046% by mass.

Samples a5 to a6 were obtained by the above-described sample preparation procedure, using an alloy powder with an average particle diameter (d50) of 48.0 μm, at a coarsening temperature of 1280° C., for a coarsening time of 12 hours, in a coarsening atmosphere of 10 kPa Ar atmosphere. The carbon content of the powder compact of Sample a5 was 0.058% by mass, and the carbon content of the powder compact of Sample a6 was 0.034% by mass.

not satisfy the predetermined standard (150 μm or more). In Samples a2 to a6, coarsening of the crystal grain size was observed. In Samples a2 to a6, while the carbon content of the alloy powders is the same, the average particle diameter of the alloy powders is different, so that the content of the powder compacts is different. Therefore, Samples a2 to a6 showed differences in the degree of coarsening of the crystal grain size and the distribution of crystal grains with insufficient coarsening. In Sample a2, the crystal grains with insufficient coarsening that were concentrated in the center in the thickness direction of the sample were present, whereas in Samples a3 to a6 with a larger average particle diameter than Sample a2, the crystal grains with insufficient coarsening were not confirmed. From the above, it has been found that the larger the average particle diameter of the alloy powder, the better the crystal grain size becomes coarsened.

Further, from Table 6, sufficient coarsening of the crystal grain size is recognized in the range where the carbon content of the powder compact is 0.034% by mass or more and 0.061% by mass or less (generally greater than 0.03% by mass and 0.07% by mass or less). In addition, when the carbon content of the powder compact was 0.074% by mass, coarsening of the crystal grain size was recognized although the criteria was not satisfied. Furthermore, since the carbide is responsible for the pinning effect on the coarsening of the crystal grain size, it is easily inferred that the crystal grain size becomes coarser even when the carbon content is smaller than 0.034% by mass. Based on this, it can be said that the crystal grain size is sufficiently coarsened when the carbon content of the powder compact is in the range of 0.07% or less.

[Verification of Difference in Grain Growth Due to Differences in Carbide-Forming Elements Contained in Alloy Powder]

In the shaping step (step S1), an experiment was conducted to verify crystal grain growth due to differences in carbide-forming elements contained in the alloy powder.

Sample h1 was obtained by the above-described sample preparation procedure, using an alloy powder with an average particle diameter (d50) of 48.0 μm, at a coarsening temperature of 1280° C., for a coarsening time of 12 hours, in a coarsening atmosphere of 10 kPa Ar atmosphere. In the alloy powder of Sample h1, elements that combine with C to form MC carbide are Ti and Nb.

TABLE 6

| | Characteristics of alloy powder | | | |
|---|---|---|---|---|
| Sample No. | Carbon content [% by mass] | Average particle diameter [μm] | Carbon content of powder compact [% by mass] | Observation and evaluation results |
| a1 | 0.006 | 10.9 | 0.074 | B |
| a2 | 0.006 | 23.6 | 0.050 | A*1 |
| a3 | 0.006 | 30.7 | 0.061 | A |
| a4 | 0.006 | 30.7 | 0.046 | A |
| a5 | 0.006 | 48.0 | 0.058 | A |
| a6 | 0.006 | 48.0 | 0.034 | A |

Table 6 shows characteristics of the alloy powders of Samples a1 to a6, and observation and evaluation results of these samples. As is apparent from Table 6, in Sample a1, while coarsened crystal grains were observed even inside the cross section of the sample, the average crystal grain size did Sample h2 was obtained by the same sample preparation procedure as Sample h1, by adding powder Ta with an average particle diameter of 25 μm to the alloy powder used in Sample h1 at a ratio of 1.65% by mass. In the alloy powder of Sample h2, elements that combine with C to form MC carbide are Ti, Nb, and Ta.

Sample h3 was obtained by the same sample preparation procedure as Sample h1, by adding powder Hf with an average particle diameter of 25 μm to the alloy powder used in Sample h1 at a ratio of 1.50% by mass. In the alloy powder of Sample h3, elements that combine with C to form MC carbide are Ti, Nb, and Hf.

TABLE 7

| | Characteristics of alloy powder | | | | |
|---|---|---|---|---|---|
| Sample No. | Carbon content [% by mass] | Average particle diameter [μm] | MC carbide forming elements | Carbon content of powder compact [% by mass] | Observation and evaluation results |
| h1 | 0.006 | 48.0 | Ti, Nb | 0.058 | A |
| h2 | 0.006 | 48.0 | Ti, Nb, Ta | 0.049 | A |
| h3 | 0.006 | 48.0 | Ti, Nb, Hf | 0.058 | A |

Table 7 shows characteristics of the alloy powders of Samples h1, h2, and h3, and observation and evaluation results of these samples. As is apparent from Table 7, coarsening of the crystal grain size was observed in any of Samples h1, h2, and h3. From the above, it has been found that, in an alloy containing at least one element of Ti, Nb, Ta, and Hf, coarsening of the crystal grain size is exhibited by limiting the carbon content of the powder compact. Since coarsening of the crystal grain size was exhibited even when MC carbides formed by Ta and Hf were included as well as MC carbides formed by Ti and Nb contained in alloy a, it is easily inferred that, also for similar alloys shown in Table 2, coarsening of the crystal grain size is exhibited by limiting the carbon content of the powder compact.

[Verification of Coarsening Time]

In the crystal grain coarsening step (step S3), an experiment was conducted to verify an appropriate coarsening time.

Four types of Samples b1 to b4 with different coarsening times were obtained by the above-described sample preparation procedure, at a coarsening temperature of 1280° C., for different coarsening times of 1, 2, 4, and 12 hours, in a coarsening atmosphere of 10 kPa Ar atmosphere. In each sample, the carbon content of the powder compact was 0.034 to 0.058% by mass.

Also, three types of Samples b5 to b7 with different coarsening times were obtained by the above-described sample preparation procedure, at a coarsening temperature of 1280° C., for different coarsening times of 4, 12, and 36 hours, in a coarsening atmosphere of a vacuum atmosphere lower than $10^{-2}$ Pa. In each sample, the carbon content of the powder compact was 0.034 to 0.058% by mass.

TABLE 8

| Sample No. | Coarsening time [hr] | Coarsening atmosphere | Observation and evaluation results |
|---|---|---|---|
| b1 | 1 | 10 kPa Ar | B |
| b2 | 2 | | A[*1] |
| b3 | 4 | | A |
| b4 | 12 | | A |
| b5 | 4 | $<10^{-2}$ Pa Vacuum | A[*3] |
| b6 | 12 | | A[*3] |
| b7 | 36 | | A[*2, *3] |

Table 8 shows observation and evaluation results of Samples b1 to b7 with different coarsening times. As is apparent from Table 8, in an inert gas atmosphere, coarsening of the crystal grain size was confirmed when the coarsening time was 2 hours or longer, and good coarsening of the crystal grain size with no uneven distribution of un-coarsened crystal grains were observed after 4 hours or longer. On the other hand, in the vacuum atmosphere, coarsening of the crystal grain size was confirmed at a coarsening time of 4 hours or longer, but evaporation of Cr was observed. Moreover, in Sample b7, partial melting was also observed. From the above, it has been found that the crystal grain size becomes coarse when the coarsening time is 2 hours or longer, but the coarsening time is desirably 4 hours or longer.

[Verification Ofcoarsening Atmosphere]

In the crystal grain coarsening step (step S3), an experiment was conducted to verify an appropriate coarsening atmosphere.

Five types of Samples c1 to c5 with different coarsening atmospheres were obtained by the above-described sample preparation procedure, at a coarsening temperature of 1280° C., for a coarsening time of 4 hours, in different coarsening atmospheres of a vacuum atmosphere lower than $10^{-2}$ Pa, 100 Pa Ar atmosphere, 1300 Pa Ar atmosphere, 10 kPa Ar atmosphere, and 104 MPa Ar atmosphere. In each sample, the carbon content of the powder compact was 0.034 to 0.058% by mass.

TABLE 9

| Sample No. | Coarsening atmosphere | Observation and evaluation results |
|---|---|---|
| c1 | $<10^{-2}$ Pa Vacuum | A[*3] |
| c2 | 100 Pa Ar | A[*3] |
| c3 | 1300 Pa Ar | A |
| c4 | 10 kPa Ar | A |
| c5 | 104 MPa Ar | A[*2] |

Table 9 shows observation and evaluation results of Samples c1 to c5 with different coarsening atmospheres. As is apparent from Table 9, while coarsening of the crystal grain size was confirmed in any of Samples c1 to c5, the evaporation of Cr was observed in Samples c1 and c2, and partial melting was observed in Sample c5. In Samples c3 and c4, good coarsening of the crystal grain size was observed. Based on this, it has been found that the evaporation of Cr can be suppressed by setting the coarsening atmosphere to an inert gas atmosphere higher than 100 Pa.

[Verification of Coarsening Temperature]

In the crystal grain coarsening step (step S3), an experiment was conducted to verify an appropiate coarsening temperature.

Samples with different coarsening temperatures and coarsening atmospheres among the coarsening conditions were prepared, and observed and evaluated, respectively.

Samples d1 to d6 were obtained by the above-described sample preparation procedure, at different coarsening temperatures of 1300, 1280, 1260, 1250, 1240, and 1220° C. as shown in Table 10, for a coarsening time of 12 hours, in a coarsening atmosphere of 10 kPa Ar atmosphere. In each sample, the carbon content of the powder compact was 0.034 to 0.058% by mass.

Samples d7 to d12 were obtained by the above-described sample preparation procedure, at different coarsening temperatures of 1300, 1280, 1260, 1250, 1240, and 1220° C. as shown in Table 10, for a coarsening time of 12 hours, in a coarsening atmosphere of a vacuum atmosphere lower than $10^{-2}$ Pa. In Samples d7 to d12, the carbon content of the powder compact was 0.034 to 0.058% by mass.

TABLE 10

| Sample No. | Coarsening temperature [° C.] | Coarsening atmosphere | Observation and evaluation results |
|---|---|---|---|
| d1 | 1300 | 10 kPa Ar | A*2 |
| d2 | 1280 | | A |
| d3 | 1260 | | A |
| d4 | 1250 | | A |
| d5 | 1240 | | C |
| d6 | 1220 | | C |
| d7 | 1300 | <$10^{-2}$ Pa Vacuum | A*2, *3 |
| d8 | 1280 | | A*3 |
| d9 | 1260 | | A*3 |
| d10 | 1250 | | A*3 |
| d11 | 1240 | | A*1, *3 |
| d12 | 1220 | | C |

Table 10 shows observation and evaluation results of Samples d1 to d12. From Table 10, in Samples d1 to d6, coarsening was confirmed in Sample d4 at a coarsening temperature of 1250° C., and coarsening was not confirmed in Sample d5 at a coarsening temperature of 1240° C., in an Ar atmosphere. From this, it is presumed that, in the alloys of Samples d1 to d6, the pinning effect disappearance temperature in the Ar atmosphere is at 1241° C. or higher and 1250° C. or lower.

Also, from Table 10, in Samples d9 to d12, coarsening was confirmed in Sample d11 at a coarsening temperature of 1240° C., and coarsening was not confirmed in Sample d12 at a coarsening temperature of 1220° C., in a vacuum atmosphere. From this, it is presumed that, in the alloys of Samples d9 to d12, the pinning effect disappearance temperature in the vacuum atmosphere is at 1221° C. or higher and 1240° C. or lower.

[Verification of Influence of Porosity Reduction Step on Coarsening Temperature]

An experiment was conducted to verify an influence of the porosity reduction step (step S2) included in the method for producing a high temperature component on the coarsening temperature of the crystal grain coarsening step (step S3).

Samples e1 and e2 were obtained by the above-described sample preparation procedure in which HIP as a porosity reduction treatment (procedure (iii)) was omitted, at different coarsening temperatures of 1300, 1280° C. as shown in Table 11, for a coarsening time of 12 hours, in a coarsening atmosphere of 10 kPa Ar atmosphere. In each sample, the carbon content of the powder compact was 0.034 to 0.058% by mass.

Samples e3 to e6 were obtained by the above-described sample preparation procedure in which HIP as a porosity reduction treatment (procedure (iii)) was omitted, at different coarsening temperatures of 1300, 1280, 1260° C. as shown in Table 11, for a coarsening time of 12 hours, in a coarsening atmosphere of a vacuum atmosphere lower than $10^{-2}$ Pa. In Samples e3 to e6, the carbon content of the powder compact was 0.034 to 0.058% by mass.

TABLE 11

| Sample No. | Coarsening temperature [° C.] | Coarsening atmosphere | Observation and evaluation results |
|---|---|---|---|
| e1 | 1300 | 10 kPa Ar | A*2 |
| e2 | 1280 | | C |
| e3 | 1300 | <$10^{-2}$ Pa Vacuum | A*2, *3 |
| e4 | 1280 | | A*3 |
| e5 | 1260 | | C |

Table 11 shows observation and evaluation results of Samples e1 to e5. From Table 11, it is apparent that a high temperature component made of a γ' precipitation strengthening-type Ni-based alloy with the coarsened crystal grain size can be obtained, also by the above-described method for producing a high temperature component in which the porosity reduction step (step S2) is omitted, that is, a method for producing a high temperature component including a shaping step (step S1) of shaping a powder compact of a desired high temperature component shape from a Ni-based alloy powder and a crystal grain coarsening step (step S3) of coarsening a crystal grain size of the powder compact by heat treatment.

Moreover, based on the fact that, while the crystal grains became coarse at a coarsening temperature of 1300° C. when the porosity reduction step (step S2) was omitted and the crystal grain coarsening step (step S3) was performed in an Ar atmosphere, the crystal grains did not become coarse at a coarsening temperature of 1280° C., it is inferred that the pinning effect disappearance temperature when omitting the porosity reduction step is at 1281° C. or higher and 1300° C. or lower. Further, based on the fact that, while the crystal grains became coarse at a coarsening temperature of 1280° C. when the porosity reduction step (step S2) was omitted and the crystal grain coarsening step (step S3) was performed in a high vacuum atmosphere, the crystal grains did not become coarse at a coarsening temperature of 1260° C., it is inferred that the pinning effect disappearance temperature when omitting the porosity reduction step is at 1261° C. or higher and 1280° C. or lower.

Table 12 shows pinning effect disappearance temperatures presumed from the verification experiment results regarding the coarsening temperature above. Also, Table 13 shows measurement results of the solidus temperature and liquidus temperature of the powder compacts having carbon contents of 0.034 to 0.058% by mass and 0.10% by mass.

TABLE 12

| Average particle diameter of alloy powder [μm] | Carbon content of powder compact [% by mass] | Pinning effect disappearance temperature [° C.] | | | |
|---|---|---|---|---|---|
| | | Without porosity reduction step | | With porosity reduction step | |
| | | 10 kPa Ar | <10⁻² Pa Vacuum | 10 kPa Ar | <10⁻² Pa Vacuum |
| 48.0 | 0034-0.058 | 1281-1300 | 1261-1280 | 1241-1250 | 1221-1240 |

TABLE 13

| Sample No. | Carbon content of powder compact [% by mass] | Solidus temperature [° C.] | Liquidus temperature [° C.] |
|---|---|---|---|
| f1 | 0.034-0.058 | 1295 | 1368 |
| f2 | 0.10 | 1265 | 1352 |

The solidus temperature and liquidus temperature were measured as follows. Samples f1 and f2 of powder compacts with different carbon contents of 0.034 to 0.058% by mass and 0.10% by mass were prepared, and each sample was measured with a differential scanning calorimeter (DSC). Based on the results, the solidus temperature and liquidus temperature of each sample were determined. The powder compact of Sample f1 was molded by MIM as shown in the step S1 of the above-described sample preparation procedure, whereas the powder compact of Sample f2 was shaped by hot isostatic pressing (HIP). More specifically, the powder compact of Sample f2 was obtained by sealing an alloy powder having a predetermined composition shown in Table 4 and an average particle diameter (d50) of 26.9 μm in a can made of mild steel and performing hot isostatic pressing at 1204° C. for 4 hours in 104 MPa Ar atmosphere, and finally removing the mild steel.

Also, from Table 12, it has been found that the pinning effect disappearance temperature is lower in the vacuum atmosphere than in the Ar atmosphere, regardless of the presence or absence of the porosity reduction step.

Further, from Table 12 and Table 13, it has been found that when omitting the porosity reduction step, in the coarsening heat treatment under Ar atmosphere, the crystal grain size of the powder compact does not become coarse unless the coarsening temperature is raised to near the solidus temperature.

Furthermore, from Table 12, it has been found that when omitting the porosity reduction step, the temperature at which the crystal grain size of the powder compact becomes coarse is high, as compared with the case of performing the porosity reduction step, in both the Ar atmosphere and the vacuum atmosphere. From these, it is inferred that the pores in the powder compact are a pinning factor that hinders coarsening of the crystal grain size, and when omitting the porosity reduction step, as compared with the case of performing the porosity reduction step, the pinning effect disappearance temperature was high. Based on this, it can be said that, in order to coarsen the crystal grain size of the powder compact at a relatively low coarsening temperature in the crystal grain coarsening step (step S3), it is preferable to perform the porosity reduction step (step S2) without omission.

Moreover, from Tables 10 and 11 with reference to Table 13, it has been found that when the coarsening temperature exceeds the solidus temperature, partial melting of the crystal structure occurs.

Further, from Table 13, it has been found that the solidus temperature is lowered when the carbon content of the powder compact is large. Since the crystal grain coarsening heat treatment temperature is equal to or higher than the pinning effect disappearance temperature and equal to or lower than the solidus temperature, it can be said that the carbon content of the powder compact is preferably small in order to expand the window.

[Verification of High-Temperature Characteristics of High Temperature Components]

In order to evaluate high temperature creep characteristics of high temperature components, test pieces and comparative test pieces were prepared by the following method, and a creep rupture test was performed in accordance with ASTM E139.

Sample g1 was obtained by the above-described sample preparation procedure, at a coarsening temperature of 1280° C., for a coarsening time of 12 hours, in a coarsening atmosphere of 10 kPa Ar atmosphere. From Sample g1, test piece g1' with a gauge length of 12 mm and a size of 3.2 mm in width and 1.5 to 2 mm in thickness was prepared. It is to be noted that the shape of the test piece g1' deviates from the standard of ASTM E139. A creep rupture test was performed on the test piece g1' while changing the test conditions between 927° C./227 MPa and 980° C./90 MPa.

Further, Comparative Sample g2 was obtained by the same procedure except that, using the alloy powder having a predetermined composition shown in Table 4 and an average particle diameter (d50) of 26.9 μm by mass percentage, the coarsening step (step S3) in the above-described sample preparation procedure was omitted, and the solution treatment was performed at 1176° C. for 2 hours in the hardening treatment (step S4) and then the aging treatment was performed at 925° C. for 16 hours. The content of C in the powder compact of Comparative Sample g2 was 0.12% by mass. From Comparative Sample g2, comparative test piece g2' with a gauge length of 16 to 20 mm and a size of 4 mm was prepared. A creep rupture test was performed on the test piece g2' while changing the test conditions among 927C/227 MPa, 980° C./90 MPa, 760° C./690 MPa, 816° C./172 MPa, 927° C./90 MPa, 927° C./50 MPa.

FIG. 6 shows the results of plotting the creep rupture test results in terms of Larson-miller parameter. In FIG. 6, literature values of In713C cast described in "SUPERALLOYS II" Chester T. Sims, Norman S. Stoloff, William C. Hagel (1987) are also included for comparison.

As is apparent from FIG. 6, the degree of divergence between the curve of Sample g1 and the curve of the In713C cast is small as compared to the degree of divergence between the curve of Comparative Sample g2 and the curve of the In713C cast. From this test result, it can be seen that Sample g1 whose crystal grain size becomes coarse by the crystal grain coarsening treatment has superior high-temperature creep strength (creep resistance) as compared to Comparative Sample g2 whose crystal grain size does not become coarse, and the high-temperature creep strength is improved to a level close to that of the cast.

The invention claimed is:

1. A method for producing a component, comprising:
a shaping step of injecting a compound obtained by kneading an alloy powder of γ' precipitation strengthening Ni-based alloy and a resin binder into a mold to shape an intermediate compact, debindering the intermediate compact, and sintering the debindered intermediate compact to shape a powder compact of a desired component shape; and
a crystal grain coarsening step of coarsening a crystal grain size of the powder compact by heat treatment,
wherein the powder compact contains 0.002% or more and 0.07% or less of C, and 5.40% or more and 8.40% or less of Al+Ti by mass percentage.

2. The method according to claim 1, further comprising:
a porosity reduction step of reducing a porosity by applying an isotropic pressure to the powder compact using a gas pressure, which is performed between the shaping step and the crystal grain coarsening step, or simultaneously with the crystal grain coarsening step.

3. The method according to claim 1, wherein
the crystal grain coarsening step includes heating the powder compact at a predetermined coarsening temperature in a vacuum atmosphere or an inert gas atmosphere, and the coarsening temperature is a temperature in the range of a pinning effect disappearance temperature specific to the powder compact or higher and a solidus temperature of the powder compact or lower.

4. The method according to claim 1, wherein
the content of C in the powder compact is greater than 0.03% and 0.07% or less by mass percentage.

5. The method according to claim 1, wherein the powder compact contains, in addition to C, Al, and Ti, 4.60% or less of Nb+Ta, 5.00% or more and 22.80% or less of Cr, 19.50% or less of Co, 1.80% or more and 13.75% or less of Mo+W, 0.10% or less of B, 1.0% or less of Zr, and 2.0% or less of Hf by mass percentage.

6. The method according to claim 1, wherein
the powder compact contains 6.00% or more and 7.50% or less of Al+Ti, 1.50% or more and 3.00% or less of Nb+Ta, 11.00% or more and 15.00% or less of Cr, 3.80% or more and 5.20% or less of Mo, 0.005% or more and 0.020% or less of B, and 0.05% or more and 0.20% or less of Zr by mass percentage, with the balance being made up of Ni and inevitable impurities.

7. The method according to claim 1, wherein
the average particle diameter of the alloy powder is 20 μm or more and 60 μm or less.

8. The method according to claim 1, wherein
the alloy powder contains 0.002% or more and 0.02% or less of C by mass percentage.

* * * * *